United States Patent
Matsui et al.

[15] 3,666,798
[45] May 30, 1972

[54] PRODUCTION OF OPTICALLY ACTIVE CHRYSANTHEMIC ACID

[72] Inventors: Masanao Matsui, Tokyo; Fukashi Horiuchi, Saitama-ken, both of Japan

[73] Assignee: Sumitomo Chemical Company, Ltd., Higashi-ku, Osaka, Japan

[22] Filed: Aug. 10, 1970

[21] Appl. No.: 62,617

[30] Foreign Application Priority Data

Sept. 12, 1969 Japan..................................44/73014

[52] U.S. Cl..................................260/514 P, 260/501.11
[51] Int. Cl..................................................C07c 61/16
[58] Field of Search....................260/468 P, 514 P

[56] References Cited

OTHER PUBLICATIONS

Eliel, Stereochemistry of Carbon Compounds. pp 49– 55 (1962)

Primary Examiner—Lorraine A. Weinberger
Assistant Examiner—Robert Gerstl
Attorney—Stevens, Davis, Miller & Mosher

[57] ABSTRACT

An optical resolution method for preparation of optically active chrysanthemic acid which comprises reacting (±)-chrysanthemic acid with L-lysine to form (+)-chrysanthemic acid L-lysine salt and decomposing the salt with a dilute acid.

8 Claims, No Drawings

PRODUCTION OF OPTICALLY ACTIVE CHRYSANTHEMIC ACID

The present invention relates to a process for preparing optically active chrysanthemic acid represented by the formula (I),

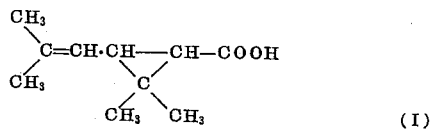

(I)

More particularly, the invention pertains to an inexpensive and commercially advantageous process for preparing optically active chrysanthemic acid, which is an intermediate for low toxic insecticides of high killing and knock down effects, by reacting ($\pm$)-transchrysanthemic acid and/or ($\pm$)-cis-chrysanthemic acid, with L-lysine which is a mono-basic amino acid.

Chrysanthemic acid (2,2-dimethyl-3-isobutenyl-cyclopropane-1-carboxylic acid) is an acid moiety constituting such esters as pyrethrin I, allethrin, phthalthrin and the like which are used as insecticides. As is clear from its structure, the acid includes cis- and transgeometrical isomers and optical isomers of said two isomers, and there are four kinds of isomers in all. It has been known that chrysanthemic acid being present in an insecticidal component obtained from pyrethrum of natural occurrence is the trans- and dextro-rotatary(+) isomer among the said isomers. Further, the biological activity of a synthetic levo-rotatory trans-chrysanthemic acid ester is far lower than that of a dextro-rotatory acid ester, and may be said to be substantially nil.

Recently, such synthetic insecticides as allethrin, phthalthrin and the like have been produced on a commercial scale. Like the ordinary synthetic products, chrysanthemic acid also is a mixture of the above-mentioned four kinds of isomers. Accordingly, esters thereof are markedly lower, in general, in insecticidal effect than those obtained from (+)-transchrysanthemic acid. Thus, it is extremely important to produce the optically active chrysanthemic acid, particularly optically active trans-chrysanthemic acid.

One of the important methods for preparing optically active substances in the synthetic chemistry, is an optical resolution. From the commercial standpoint this optical resolution method is an important technique particularly when used in combination with the technique for recemization of the unnecessary antipode.

Known processes for preparing optically pure (+)-trans-chrysanthemic acid by the optical resolution of ($\pm$)-trans-chrysanthemic acid are as follows:

1. A process which comprises adding quinine to ($\pm$)-trans-chrysanthemic acid in an alcohol to deposit a quinine salt of (−)-trans-chrysanthemic acid, which is separated by filtration, concentrating the filtrate, decomposing the residual (+)-rich acid quinine salt with dilute hydrochloric acid to form a free impure (+)-acid, treating the impure (+)-acid with (−)-α-phenethylamine in aqueous ethanol to form (−)-α-phenethylamine salt, which is subjected to recrystallization and then decomposition with a mineral acid to obtain optically pure (+)-trans-chrysanthemic acid. (I.G.M. Campbell and S.H. Harper: J. Sci. Food Agric., 3, 189, 1952)

2. A process in which D-(−)-threo-1-p-nitrophenyl-2-dimethylaminopropane-1,3-diol is used as an optical resolving agent. (French Pat. No. 1,536,458)

According to the above-mentioned process (1), the optically pure (+)-trans-chrysanthemic acid is obtained by first removing unnecessary (−)-trans-chrysanthemic acid by use of quinine which is expensive and not always easily obtainable in large quantities, and then treating the residual (+)-trans-chrysanthemic acid-rich portion with (−)-α-phenethylamine obtained by optical resolution of the synthetic recemic compound. When the known process (1) is adopted, therefore, optical resolution should be effected 3 times in all. Thus, it may be said that according to the process (1), the commercial scale production of (+)-trans-chrysanthemic acid should be very difficult.

The above-mentioned process (2) also have problems in that the optically active derivative of the antibiotic chloramphenicol is to be used as a base. When the base has been obtained from natural source, it is high in cost and is considered to be more expensive than quinine. When it has been prepared synthetically, it is not usable for the resolution of chrysanthemic acid unless it has been optically resolved like in the case of the above-mentioned phenethylamine. Thus, it may be said that from the commercial standpoint, the process (2) has the same drawbacks as in the case of the process (1).

As the result of extensive studies on processes for the commercial scale production of optically active chrysanthemic acid, the present inventors have found that substantially optically pure chrysanthemic acid can be obtained with extreme ease and in a high yield by use of L-lysine which is produced in fermentation industry at present and available at extremely low cost and in large quantities.

Thus, the present invention is to provide a process for the production of an optically active chrysanthemic acid, which comprises heating a mixture of ($\pm$)-chrysanthemic acid and L-lysine in a water miscible organic solvent, or in a mixture of the solvent and water or in a mixture of methanol and other organic solvents, cooling the mixture to crystallize (+)-chrysanthemic acid L-lysine salt, and decomposing the salt with a dilute mineral acid.

In the present invention, the chrysanthemic acid means trans-chrysanthemic acid, cis-chrysanthemic acid and a mixture thereof.

The process of the present invention is carried out in such a manner as mentioned below.

($\pm$)-Chrysanthemic acid L-lysine salt is dissolved in a water-miscible organic solvent or a mixture thereof with water or in a mixed solvent comprising methanol and other organic solvents at an elevated temperature below the boiling point of the solution. After cooling the solution (to 30° to −30°C), the deposited crystals are collected by filtration. The crystals are desired optically pure (+)-chrysanthemic acid salt. If necessary, the filtrate may be concentrated to obtain the second crop. The thus obtained (+)-chrysanthemic acid L-lysine salt is decomposed with a mineral acid such as hydrochloric acid or diluted sulfuric acid and then extracted, whereby (+)-chrysanthemic acid can be obtained in a high yield and in an optically pure state.

Examples of the water-miscible organic solvent usable in the present invention include lower aliphatic alcohols such as methanol, ethanol, isopropanol and the like, ketones such as acetone and the like, ethers such as dioxane, tetrahydrofuran and the like, and non-protonic polar solvents such as N,N-dimethylformamide, dimethyl sulfoxide and the like. If desired, the L-lysine used as the resolving agent may be recovered according to an ordinary procedure from the aqueous layer after decomposition of the salt.

The present invention is illustrated in further detail below with reference to examples, which are, of course, not to limit the scope of the present invention.

EXAMPLE 1

A mixture of 15.30 g of L-lysine and 17.50 g of ($\pm$)-trans-chrysanthemic acid was dissolved in 185 ml. of anhydrous methanol on a steam bath. After cooling, the solution was allowed to stand overnight in an ice chamber, and crystals formed were collected by filtration and washed with 100 cc of cold anhydrous methanol to obtain 10.80 g of (+)-trans-chrysanthemic acid L-lysine salt, m.p. 201° – 202° C.

On the other hand, the filtrate was concentrated to a volume about one-fifth that of the original filtrate and then allowed to stand overnight in the ice chamber to obtain 4.06 g of a second crop of crystals, m.p. 192° – 198° C.

The first and second crops of crystals were individually decomposed, without recrystallization, with 2N–HCl. The free acid was extracted with ether, and extracts were washed with a saturated sodium chloride solution and dried over anhydrous magnesium sulfate, and then the ether was removed by distillation. From the first crop 4.40 g (25.1 percent of the theoretical amount) of a colorless transparent oil, $[\alpha]_D^{22} + 13.3°$ (ethanol), was obtained, and from the second crop 2.10 g of a colorless transparent oil, $[\alpha]_D^{22} + 10.2°$ (ethanol), was obtained.

These oils were identical in infrared absorption spectrum with (+)-trans-chrysanthemic acid obtained by a known process.

EXAMPLE 2

A mixture of 15.30 g of L-lysine and 17.50 g of (±)-trans-chrysanthemic acid was dissolved in hot 180 ml. of 95 percent aqueous methanol. After the solution was cooled and allowed to stand overnight in an ice chamber, the crystals formed were collected by filtration, and thoroughly washed with cold 95 percent aqueousmethanol to give 11.55 g of crude (+)-trans-chrysanthemic acid L-lysine salt, m.p. 196° – 201° C. Two recrystallization of this salt from 95 percent aqueous methanol gave 8.70 g of pure (+)-trans-chrysanthemic acid L-lysine salt, m.p. 203° – 204° C, $[\alpha]_D^{22} + 12.0°$ (water).
Elementary analysis
Calculated for $C_{16}H_{30}N_2O_4$: C, 61.12; H, 9.62; N, 8.91.
Found: C, 61.04; H, 9.59; N, 8.80.

Decomposition of this salt in the same manner as in Example 1 gave 4.27 g of a colorless transparent oil of (+)-trans-chrysanthemic acid, $[\alpha]_D^{22} + 14.2°$ (ethanol). When this oil was distilled under reduced pressure, the portion boiling at 70° – 74°/0.1 mmHg was collected. The yield was 3.91 g, $[\alpha]_D^{22} + 14.4°$ (ethanol).
Elementary analysis
Calculated for $C_{10}H_{16}O_2$: C, 71.39; H, 9.59.
Found: C, 71.57; H, 9.52.

EXAMPLE 3

A mixture of 16.80 g of L-lysine and 19.35 g of (±)-trans-chrysanthemic acid was dissolved at an elevated temperature in 110 g of 85 percent aqueous ethanol. After cooling, the solution was allowed to stand overnight in an ice chamber, and the crude L-lysine salt of (+)-trans-chrysanthemic acid crystallized as colorless needles was collected by filtration and washed with cold 85 percent aqueous ethanol. The yield was 8.20 g, m.p. 196°– 201° C. This salt was recrystallized from 85 percent aqueous ethanol to give 5.7 g of pure (+)-trans-chrysanthemic acid L-lysine salt, m.p. 203° – 204° C. The filtrate and the washings were combined, and then the solvent was removed under reduced pressure. Two crystallizations of the residue from 92 percent aqueous ethanol afforded a second crop, weighed 4.0 g, m.p. 202° – 204° C.

The first and second crops were individually decomposed in the same manner as in Example 1 and the acid was distilled under reduced pressure. From the first crop 2.10 g of (+)-trans-chrysanthemic acid, $[\alpha]_D^{22} + 14.2°$ (ethanol), and from the second crop 1.35 g of (+)-trans-chrysanthemic acid, $[\alpha]_D^{22} + 13.9°$ were obtained. The oil obtained from the first crop crystallized when it was cooled in an acetone-dry ice bath and then allowed to stand in an ice chamber, m.p. 18° – 20° C.

EXAMPLE 4

To a hot solution of 16.8 g of (±)-cis-chrysanthemic acid in 80 ml. of absolute methanol was added 14.6 g of L-lysine. The resulting solution was cooled slowly and allowed to stand overnight at room temperature (25° C) to crystallize the crude (+)-cis-chrysanthemic acid L-lysine salt which was collected by suction filtration and washed on the filter with 10 ml. of cold absolute methanol. The yield was 12.7 g, m.p. 204°– 206° C. $[\alpha]_D^{25} + 18.44°$ ($H_2O$). Two recrystallizations of the crude salt from 80 percent aqueous methanol gave pure L-lysine salt of (+)-cis-chrysanthemic acid, 7.3 g, m.p. 205° – 206° C, $[\alpha]_D^{25} + 20.43°$ ($H_2O$).

The pure salt was decomposed with 2N hydrochloric acid and the free acid was extracted with three 25 ml. portions of ether. The extracts were washed with saturated sodium chloride solution and dried over anhydrous magnesium sulfate, and the solvent was removed off.

The pure (+)-cis-chrysanthemic acid was distilled under reduced pressure. The yield of the material boiling at 90° – 93°/0.3 mmHg was 3.6 g. The pure acid crystallized by standing in an ice chamber and melted at 42°, $[\alpha]_D^{25} + 39.35°$ (ethanol), $[\alpha]_D^{25} + 85.27°$ (chloroform).

What we claim is:

1. A process for the production of optically active chrysanthemic acid, which comprises heating a mixture of a (±)-chrysanthemic acid and L-lysine in a solvent selected from the group consisting of methanol, ethanol, and dimethyl sulfoxide, mixtures thereof with water and a mixture of methanol with ethanol or dimethyl sulfoxide, cooling the mixture to crystallize (+)-chrysanthemic acid L-lysine salt and decomposing the salt with a mineral acid.

2. A process according to claim 1 wherein the solvent is methanol.

3. A process according to claim 1 wherein the solvent is ethanol.

4. A process according to claim 1 wherein the solvent is dimethyl sulfoxide.

5. A process according to claim 1 wherein the solvent is a mixture of water and methanol, ethanol, or dimethyl sulfoxide.

6. A process according to claim 1, wherein the chrysanthemic acid is trans-chrysanthemic acid and/or cis-chrysanthemic acid.

7. A process according to claim 1, wherein the heating is effected at 40° to 120° C.

8. A process according to claim 1, wherein the cooling is effected at 30° to −30° C.

* * * * *